United States Patent [11] 3,620,726

[72] Inventors Victor Fu-Hua Chu
East Brunswick;
Charles Walter Manger, Irvington, both of N.J.
[21] Appl. No. 701,487
[22] Filed Jan. 29, 1968
[45] Patented Nov. 16, 1971
[73] Assignee E. I. du Pont de Nemours and Company
Wilmington, Del.

[54] PROCESS USING COLORED PARTICLES TO DEVELOP PHOTOHARDENABLE IMAGING LAYERS

7 Claims, 1 Drawing Fig.

[52] U.S. Cl. .......... 96/27 R, 96/28, 96/115 P, 117/17.5
[51] Int. Cl. .......... G03c 5/04, G03c 1/68, G03c 11/12
[50] Field of Search .......... 96/115, 27, 28, 1; 117/17.5

[56] References Cited
UNITED STATES PATENTS
3,060,024 10/1962 Burg et al. .......... 96/28
3,060,025 10/1962 Burg et al. .......... 96/28
3,445,229 5/1969 Webers .......... 96/28
OTHER REFERENCES
Xerography and Related Processes, Focal Press, N.Y. N.Y. by Dessaner et al., 1965, page 288

*Primary Examiner*—George F. Lesmes
*Assistant Examiner*—John C. Cooper, III
*Attorney*—Lynn Barratt Morris

ABSTRACT: An improved image reproduction process in which an element having a support and a photohardenable layer, after imagewise exposure to actinic radiation to harden the layer in exposed areas without hardening in the underexposed areas, is colored only in the underexposed areas by dusting it or bringing it into contact with a surface bearing loosely bound colorant, the improvement being in the use of colorant having a particle size distribution within the range 0.2–30 microns with not more than 50 percent of particles being of less than 1 micron equivalent spherical diameter.

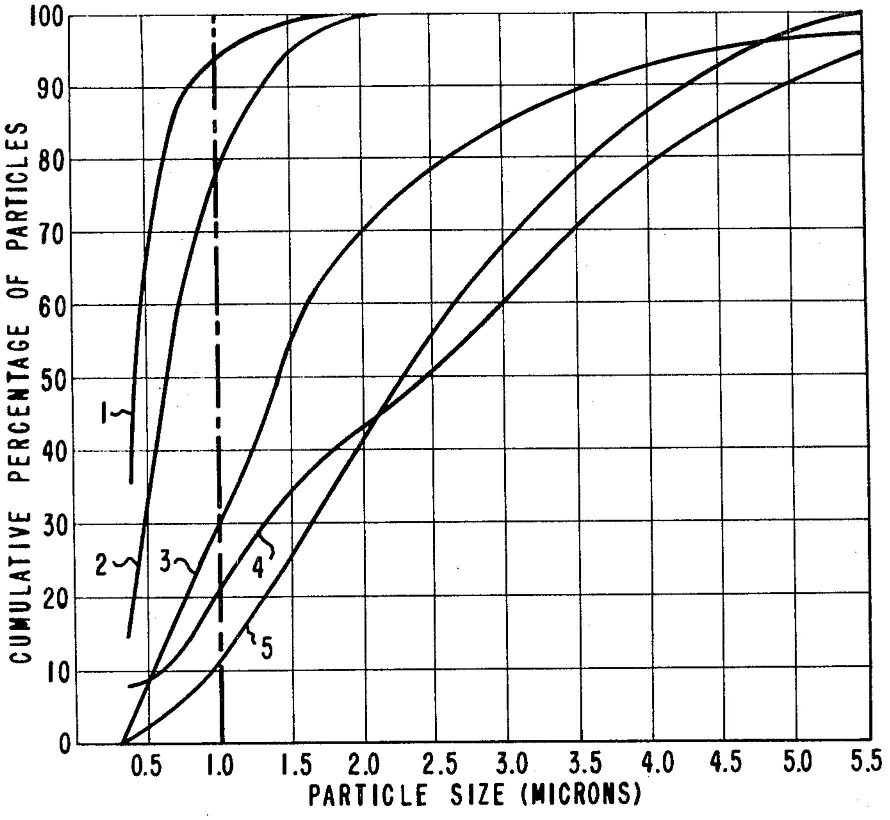
INVENTORS
VICTOR FU-HUA CHU
CHARLES WALTER MANGER
BY Lynn Barratt Morris
ATTORNEY

PROCESS USING COLORED PARTICLES TO DEVELOP PHOTOHARDENABLE IMAGING LAYERS

BACKGROUND OF THE INVENTION

1. Field of the Invention

Image reproduction processes that employ photohardenable material as the image-forming material and comprise the imagewise exposure of the photo hardenable layer and some form of image readout which may be (1) dusting with colorant, (2) bringing the layer into contact with a surface bearing loosely bound colorant, or (3) image transfer to integral or separate receptors followed by coloring of the unpolymerized material on the support and/or the receptor. Specific image reproduction processes which benefit from the improvement embodied in this invention are disclosed and claimed in U.S. Pat Nos. 3,060,023; 3,060,024; 3,060,025; 3,060,026; and 3,202,508; and assignee's U.S. application of Celeste and Chu, U.S. Ser. No. 684,945 filed Nov. 22, 1967.

2. Description of the Prior Art

The just mentioned patents disclose methods of intensifying photopolymer images by using coloring materials and both room temperature and thermal image transfer processes, wherein the elements employed may or may not contain an integral cover sheet.

In practicing these prior art processes, however, it is on occasion found that the image intensifying colorant or toner adheres to the exposed areas of the image. This staining of the exposed areas of the image is usually most pronounced when the original support is toned. Transfer of the support image to an integral or separate image receptor either before or after toning tends in certain processes to lessen and may in some cases eliminate the problem. Each transfer of the original image results, however, in a lowering of image resolution. Increasing the imagewise exposure of the photohardenable element also tends to reduce the stain, but it also results in undercutting of the small dots in halftone exposures and fine lines in line exposures thereby reducing image quality.

SUMMARY OF THE INVENTION

This invention relates to an improved image reproduction process in which an element having a suitable support and a photohardenable layer is imagewise exposed to actinic radiation to harden the layer in exposed areas without hardening in the underexposed areas and is then colored only in the underexposed areas by dusting it with discrete particles or bringing it into contact with a surface bearing loosely bound discrete particles and removing nonadherent particles in exposed hardened areas, the improvement being in the use only of pigments whose particle size distribution is within the range 0.2–30 microns, preferably within the range of 5.0–10.0 microns, with not more than 50 percent of the particles being of less than 1 micron equivalent spherical diameter.

The processes of the invention may include thermal or room temperature transfer, either before or after coloring, of unpolymerized material from the support to a separate image receptor. The processes may also employ an element that has (1) an integral protective cover sheet which is stripped from the element after exposure, but before coloring or image transfer, or (2) an integral image receptive cover sheet which effects image transfer to it upon stripping and which may be colored with the preferred pigments.

The use of coloring materials with the preferred particle size distributions results in a marked lowering of stain in the exposed areas of the element. This is evidenced in pigments which normally contain a high percentage of fines and which are processed by elutriation to separate out these fines. While it is true that different photohardenable matrices have varying susceptibility to stain, even relatively stain resistant matrices show a dramatic lowering of stain when normally staining colorants are treated to bring their particle size distribution within the limits set by the test embodied in the present invention. As mentioned above, it is possible to lower stain by increasing exposure at the expense of losing definition in the highlight areas. All tests to determine the validity of the beneficial effect of using the colorant size distribution embodied in this invention were practical and which did not cause detectable undercutting of image areas.

DESCRIPTION OF THE PREFERRED EMBODIMENTS

In general, the invention comprises an improved image reproduction process in which an element comprising a support and a photohardenable layer (1) is imagewise exposed sufficiently to polymerize or harden throughout the entire thickness of photosensitive material in the exposed areas of the layer, while causing no substantial hardening in the nonexposed areas and (2) is toned, by dusting or bringing it in contact with a surface bearing loosely bound colorant, the improvement characterized by the use of colorants which either naturally or by certain treating means have particles of sizes within the range 0.2 to 30 microns, not more than 50 percent of the particles being below 1$\mu$ equivalent spherical diameter (measured by the test below).

The term "particle size" as used herein covers the size distribution of the smallest, independently acting unit of colorant which is called upon to discriminate between the exposed and underexposed areas of the imaging layer. As such the particle may in actuality be (1) a single crystallite or crystals (as synthesized), )(2) an aggregate or agglomerate of pigment crystallites, (3) a matrix particle containing dye in solution, or (4) a matrix particle containing evenly dispersed pigment crystallites.

For the purpose of determining whether a colorant has the preferred particle size distribution and will therefore have the desired nonstaining characteristic, the following test is performed. A sample of the colorant is placed on an electron microscope grid and the excess is blown off. A series of exposures are taken of various areas of the sample grid at a magnification of 1400X, said exposures containing a total of about 150 measurable particles. The exposures are than photographically enlarged to give a total magnification of 5000X and the equivalent spherical diameters of the particles are measured. The "equivalent spherical diameter" is the diameter of a circle having approximately the same area as that of the photographic image of the pigment particle. The particle sizes may then be plotted as shown in the graph for five pigments that have varying stain characteristics.

In the graph of the attached drawing:

| Colorant | Description | Manufacturer and product No. |
|---|---|---|
| 1 | Monastral ® Blue G (C.I. Pigment Blue 15). | E.I. du Pont de Nemours and Co. BT-383-D. |
| 2 | Molybdate Orange (C.I. Pigment Red 104). | E.I. du Pont de Nemours and Co. YE-421-D. |
| 3 | Toluidine Red YW-(C.I. Pigment Red 3)-process aggregated crystals. | E.I. du Pont de Nemours and Co. RL-554-D. |
| 4 | Phthalo Blue (C.I. Pigment Blue 15)-cellulose acetate dispersion. | Allied Chemical Corporation Harmon Colors B-4709. |
| 5 | Toluidine Red (C.I. Pigment Red 3). | E.I. du Pont de Nemours and Co. RT-386-D. |

The vertical broken line represents the one micron diameter line. If the 50 percent point on the particular plot falls to the right of that line, the colorant is a nonstaining or minimum staining colorant as described in the invention.

The terms "photopolymerizable" and "photohardenable" as used herein refer to systems in which the molecular weight of at least one component of the photo sensitive layer is increased by exposure to actinic radiation sufficiently to result in a change in the rheological and thermal behavior of the exposed areas.

The term "underexposed" as used herein is intended to cover the image areas of the photohardenable layers which are completely unexposed or those exposed only to the extent that there is photohardenable compound still present in sufficient quantity that the molecular weight, and therefore the softening temperature, remains substantially lower than that of the complementary exposed image areas.

Various embodiments of this improved process may employ elements which include protective cover sheets which may or may not be an image receptor. In addition these embodiments may incorporate the steps of room temperature or thermal transfer to either an integral or separate image receptor.

Among suitable photopolymerizable or phorohardenable systems are: (1) systems in which a photopolymerizable monomer is present alone or in combination with a compatible binder, or (2) systems in which the photohardenable group, attached to a polymer backbone, becomes activated on exposure to light and may then cross-link by reacting with a similar group or other reactive sites on adjacent polymer chains. In the second group of suitable photohardenable system, where the monomer or pendent photohardenable group is capable of addition polymerization, e.g., a vinyl monomer, the photopolymerized chain length may involve addition of many similar units initiated by a single photochemical act. Where only dimerization of similar compounds is involved, e.g., benzophenone or cinnamoyl compounds, the average molecular weight of the photosensitive constituent can be at best only doubled by a single photochemical act. Where a photopolymerizable molecule has more than one reactive site, a cross-linked network can be produced.

In a preferred photopolymer image reproduction element, the base support is a material which is stable at the operating temperatures of the element. The base support may be coated with a hydrophobic copolymer as described in Alles, U.S. Pat. No. 2,779,684, example IV. Suitable materials for the base supports are those disclosed in U.S. Pat No. 3,060,023.

If either a simple monomer or monomer-polymer binder system is being used, the element in the preferred process contains a free radical generating addition polymerization initiator, activatable by actinic light, e.g., ultraviolet and visible light are listed in U.S. Pat. No. 3,060,023. The initiator combination compositions of photographic silver halide sensitizing agents and bromine donor compounds or reducing aliphatic amines of Belgian Pat. No. 682,048 and 682,052, Dec. 5, 1966, are also useful in the photopolymerizable layers of this invention, as are the dyeredox initiator systems disclosed in Belgian Pat. No. 681,944, Dec. 1, 1966.

Suitable free radical initiated, chain propagating addition polymerizable ethylenically unsaturated compounds for use in the simple monomer or monomer-polymer binder photopolymerizable layers are described in Burg et al., U.S. Pat. No. 3,060,023; Celeste et al. U.S. Pat. No. 3,261,686; and in assignee's Cohen and Schoenthaler, Belgian Pat. No. 664,445, Nov. 25, 1965. Polymers for use in the monomer-polymer binder system are described in U.S. Pat. No. 3,060,023.

Where the polymer is a hard, high melting compound, a plasticizer is usually used to lower the glass transition temperature and facilitate transfer in the underexposed areas, The plasticizer may be a monomer itself, e.g., a diacrylate ester, or any of the common plasticizers which are compatible with the polymeric binder. Among the common plasticizers are polyethylene glycol, phosphate esters, e.g., triphenyl phosphate, and phthalates, e.g., dibenzyl phthalate.

Photodimerizable materials useful in the invention are cinnamic acid esters of high molecular weight polyols, polymers having chalcone and benzophenone type groups, and others disclosed in chapter 4 of "Light-Sensitive Systems" by Jaromir Kosar published by John Wiley & Sons, Inc., New York, 1965. Photohardenable materials capable of photocrosslinking with more than one adjacent polymeric chain to form a network are described in assignee's U.S. applications Ser. No. 451,300 by A. C. Schoenthaler filed Apr. 27, 1965, and U.S. Pat No. 3,418,295 and Ser. No. 477,016 by J. R. Celeste filed Aug. 3, 1965, now abandoned but first refiled as Ser. No. 759,217, filed Sept. 11, 1968, now U.S. Pat. No. 3,469,982, Sept. 30, 1969.

Whether a receptor sheet is used and of what material it is made, are determined by the product desired as the result of the process of the invention. The receptor sheet should be thermally stable in the range of operating temperatures, and if used as an integral cover sheet on the photohardenable element, it should preferably have low permeability to oxygen. Suitable receptor sheets are disclosed in U.S. Pat. No. 3,060,023.

For a colorant to be used satisfactorily in the process of this invention it must (1) be nonstaining, (2) have adequate density and color quality, (3) be easy to apply, and (4) be compatible with the photohardenable matrix. Nonstaining performance is difficult to achieve because the characteristics that made a colorant nonstaining tend to mitigate against it achieving adequate density and color quality. As regards colorant particle size, it has been determined that if the majority of particles are less than 1 micron equivalent spherical diameter, as determined by the test described, staining will occur.

A variety of equipment capable of classifying colorant particles by size is available. Most of these instruments employ a stream of fluid in a vertical tube working against gravity and segregate the particles into various size groupings based on the terminal velocities of the particles. This process is sometimes called wet or dry elutriation depending upon the fluid being used. An ideal equipment combination would be one in which undersize particles are automatically removed from the colorant and oversize particles are automatically separated out, ground down in size, and then fed back into the classifier, with the process being repeated as required.

Almost all pigments as normally used will cause stain to some noticeable degree because of their extremely small crystallite sizes on the order of 0.1 micron equivalent spherical diameter. There are certain pigments, e.g., Toluidine Red (C.I. Pigment Red 3), Toluidine Yellow (C.I. Pigment Yellow 1), and copper phthalocyanine and quinacridone crystals which have large enough crystallite size so that their particle size distribution shows the desired breakdown and no staining occurs at the proper exposure levels.

For the most part, however, pigments, to be satisfactory, will have to be in some form other than the simple crystallite form. They may be aggregates, e.g., Toluidine Red YW (C.I. Pigment Red 3), Watchung Red BW (C.I. Pigment Red 48), Toluidine Yellow GW (C.I. Pigment Yellow 1), Monastral Blue BW (C.I. Pigment Blue 15), Monastral Green BW (C.I. Pigment Green 7), Pigment Scarlet (C.I. Pigment Red 60), Auric Brown (C.I. Pigment Brown 6), Monastral Green G (Pigment Green 7) and Monastral Maroon B and Monastral Orange, both of which last pigments are sold the manufacturer under product nos. RT-849-D and YT-756-D, respectively.

Aggregation is sometimes achieved by the addition of certain wetting agents used in making water dispersible pigments. Aggregation may also be achieved by treating the pigment crystallite surface with gelatinlike or monomeric substances to bind them by adhesion to other crystallites. Pigments which in their crystallite form cause severe staining have been made nonstaining by such treatment. It is usually necessary to dry grind aggregates in order to achieve proper balance of nonstaining properties and density.

A third form of colorant acceptable for use in the process of this invention is one in which a dye is in solid solution in a matrix particle. The particle may have to be dry ground in order to get proper effective particle size. Examples of commercially available colorants of this type are Lumigraphic Red and Lumigraphic Green both manufactured by Imperial Color and Chemical Department, Division of Hercules Inc. Glens Falls, N.Y., under the product numbers X-2489 and X-2523, respectively.

A fourth method of making an acceptable colorant is by finely dispersing pigment crystallites in a resin matrix and then grinding the dry resin particles to the proper effective particle size. This method affords the opportunity of having the very small pigment crystallites required for high color density in the form of a nonstaining colorant particle of proper effective particle size. Resin matrices, e.g., polyvinyl chloride, cellulose acetate, cellulose acetate butyrate, polystyrene, polymethyl methacrylate, are useful, as are water soluble polymer matrices, e.g., polyvinyl alcohol, methyl cellulose, carboxymethyl cellulose, the particular matrix being used depending on the mechanical means of processing the colorant down to the desired effective particle size and the photohardenable matrix being used. Particular colorants of this form which are useful in the process of this invention are illustrated in the examples that follow.

The exposure of the photopolymerizable element may be through a two-tone image or a process transparency, e.g., a process negative or positive (an image-bearing transparency consisting solely of substantially transparent areas where the opaque areas are substantially of the same optical density, the so-called line or halftone negative or positive). The image or transparency and the element may or may not be in operative contact, e.g., contact exposure or projection exposure, and in the case of an element that has both support and cover sheet of a transparent material, exposure may be through either side. It is possible to expose through paper or other light transmitting materials, but a stronger light source or longer exposure times must be used.

Reflex exposure techniques are useful in the process of the invention, especially when office copies are made. By using reflex exposure, copies can be made from opaque supports and translucent supports which may have printed images on both sides. By using this technique there is no loss in speed or resolution, and right reading copies are obtained directly on the cover sheet upon thermal delamination.

Since most of the photohardenable materials preferred in this invention generally exhibit their maximum sensitivity in the ultraviolet range, the light source should furnish an effective amount of this radiation. Such sources include carbon arcs, mercury-vapor arcs, fluorescent lamps with special ultraviolet light-emitting phosphors, argon glow lamps, electronic flash units and photographic flood lamps. Of these the mercury vapor arc, particularly the sun lamp type, and the fluorescent sun lamps, are most suitable. Other light sources are satisfactory when materials sensitive to visible light are used. The amount of exposure required for satisfactory reproduction of a given element is a function of exposure time, type of light source used, and distance between light source and element. The proper balance of these three variables for any given operation is best determined by exposing and processing step wedge test strips.

As mentioned above, variations of the process of this invention may include transfer of the unpolymerized image to an integral or separate image receptor. Multiple transfers from the base support to image receptors are also possible depending on the thickness of the photohardenable layer.

The invention will be further illustrated by, but is not intended to be limited to, the following detailed examples of various embodiments.

EXAMPLE I

The following photohardenable solution was prepared:

| | | |
|---|---|---|
| 1. | Methyl methacrylate polymer | 36.5 g. |
| 2. | Trichlorethylene | 415.0 g. |
| 3. | 2-ethylanthraquinone | 12.5 g. |
| 4. | A2,2'-dihydroxy-4-methoxy-benzophenone | 1.0 g. |
| 5 | Polyoxyethylated trimethylol propane triacrylate (Refer to example I of French Pat No. 1,444,298, May 23, 1966) | 40.5 g. |
| 6 | Polyoxyethylene lauryl ether | 5.5 g. |

The solution was coated to a dry coating weight of 195 mg./dm.$^2$ on five sheets of 0.004"-thick polyethylene terephthalate base support which were coated with a thin vinylidene chloride copolymer sublayer as described in example IV of Alles, U.S. Pat. No. 2,779,684. The coating was allowed to dry. A 0.001"-thick polyethylene terephthalate film was laminated to the photohardenable layer at the following laminating conditions: temperature, 125° C.; speed, 60 in./min.; nip force, 4 lbs./in. of nip length.

The element was exposed for 60 sec. through a positive halftone transparency using a nuArc "Flip Top" Plate Maker, Model FT26M-2 carbon arc. The 0.001"-thick cover sheet was stripped at room temperature from the element, with no transfer of unhardened material to the cover sheet.

The five toners shown in the drawing were used to "read out" the unhardened image areas, with one toner being applied at room temperature to each element, using an applicator brush and a cotton pad to remove the particles from the hardened areas and excess particles from unhardened areas.

The elements toned with pigments 1 and 2 showed very high levels of stain, while the stain level on the elements coated with pigments 3, 4, and 5 showed little or no discernible stain in hardened areas.

EXAMPLE II

The following solution was prepared:

| | | |
|---|---|---|
| 1. | Methyl methacrylate polymer | 50.0 g. |
| 2. | Trimethylolpropane trimethacrylate monomer | 64.0 g. |
| 3. | Polyoxyethylene lauryl ether | 5.0 g. |
| 4. | 2-o-chlorophenyl-4,5-bis-(m-methoxphenyl)imidazolyl dimer | 2.0 g. |
| 5. | 2-mercaptobenzthiazole | 0.25 g. |
| 6. | 7-diethylamino-4-methyl-coumarin | 0.25 g. |
| 7. | Trichlorethylene to bring solution to: | 500.0 g. |

Five photohardenable elements were prepared as in example I and were exposed for 8 seconds through the same positive halftone transparency under a Sylvania, Model SG-60, 1000W sun gun at a distance of 36 inches.

Toning was carried out as in example I and the results showed that pigments 1 and 2 stained the exposed areas of the element. The stain was of discernibly lower density than in example I. Pigments 3, 4, and 5 gave no or very slight detectable stain. The photohardenable material in this element exhibited less general susceptibility to staining, but the relative staining tendency of the toners was exhibited even though the stain density for all five colorants was reduced.

EXAMPLE II

Samples of the photohardenable element of example I were prepared for the purpose of testing the colorants tabulated below. Each colorant was first analyzed by the photomicrograph test described above, the results of which are included in the table.

| Pigment | C.I. No. | Type | Manufacturer and code No. | Percent of colorant particles, Δμ dia. | Stain character |
|---|---|---|---|---|---|
| Toluidine Yellow. | Pig. Yel. 1 | Large free crystallites | YT-445-D[1] | <50 | None. |
| Monastral ® Blue BW | Pig. Bl. 15 | Mostly aggregated | BP-192-D[1] | <50 | Do. |
| Toluidine Yellow GW | Pig. Yel. 1 | do | YL-660-D[1] | <50 | Do. |
| Monastral ® Green BW | Pig. Gr. 7 | do | GP-511-D[1] | <50 | Do. |
| "Watchung" Red BW | Pig. Red 48 | do | RL-555-D[1] | <50 | Do. |
| Naphthanil® Red Dark | Pig. Red 23 | Aggregated—some free crystallites | RT-539-D[1] | <50 | Slight. |
| "Watchung" Red B | Pig. Red 58 | do | RT-867-D[1] | <50 | Do. |
| Monastral ® Blue B | Pig. Bl. 15 | do | BL-288-D[1] | <50 | Do. |
| Orange OT | Pig. Or. 13 | do | YT-582-DR[1] | <60 | Do. |
| Benzidine Yellow | Pig. Yel. 12 | Aggregated and free crystallites | YT-553-D[1] | >50 | Moderate. |
| Naphthanil ® Red Dark | Pig. Red 23 | do | RM-545-D[1] | >50 | Do. |

| Pigment | C.I. No. | Type | Manufacturer and code No. | Percent of colorant particles, Δμ dia. | Stain character |
|---|---|---|---|---|---|
| Primrose Yellow | Pig. Yel. 34 | Mostly free crystallites | Y-707-D[1] | >50 | Heavy. |
| "Watchung" Red Y | Pig. Red 48 | do | RT-841-D[1] | >50 | Do. |
| Duol ® Carmine | Rig. Red 57 | do | RT-443-D[1] | >50 | Do. |
| Monastral ® Green G | Pig. Gr. 7 | do | GT-751-D[1] | >50 | Do. |
| Monastral ® Blue G | Pig. Bl. 15 | do | BT-383-D[1] | >50 | Do. |
| Copper Phthalocyanine | Pig. Bl. 15 | Crude | (1) | <50 | None. |
| Polychloro Copper Phthalocyanine | Pig. Gr. 7 | do | (1) | <50 | Do. |
| Jungle Black | Pig. Black1 | Mostly aggregated | (2) | <50 | Do. |
| Fluorescent Red | None | Dye solution in a matrix particle | (3) | <50 | Do. |
| Fluorescent Green | do | do | (3) | <50 | Do. |
| Vynolour Phthalo Blue | do | 60% pigment-40% vinyl resin dispersion | B-4715[4] | <50 | Do. |
| Vynolour Phthalo Green | do | do | G-5060[4] | <50 | Do. |
| Phthalo Blue C/A Disperion Powder | do | Cellulose acetate dispersed pigment | B-4709[4] | <50 | Do. |
| Bright Tone Maroon C/A Dispersion Powder | do | do | M-6676[4] | <50 | Do. |

[1] E. I. duPont de Nemours & Co., Inc., Wilmington, Del.
[2] Ansbacher-Siegle, 92 Chestnut Avenue, Rosebank, S.I. 5, N.Y.
[3] Imperial Color & Chemical Department, Division of Hercules, Inc., Glens Falls, N.Y.
[4] Allied Chemical Corp.—Harmon Colors, Hawthorne, N.J. 07507.

Analysis of stain after dusting and removal as in example I showed a distinct relationship between particle size distribution and stain level. Colorants which contained a majority of particles above 1 micron equivalent spherical diameter showed clearly less stain susceptibility than colorants with a majority of less than 1 micron diameter particles. In no case did the stain level of a colorant having less than 50 percent of its particles less than 1 micron equivalent spherical diameter exceed the stain level of those colorants having more than 50 percent less than 1 micron equivalent spherical diameter.

EXAMPLE IV

Six photohardenable samples were prepared by the method shown in example I. Three colorants which resulted in moderate to heavy stain, as shown in example III, were selected: Primrose Yellow (C.I. Pigment Yellow 34) (moderate stain); Monastral Blue G (C.I. Pigment Blue 15) (heavy stain); and Duol Carmine (C.I. Pigment Red 57) (heavy stain). Each colorant was treated as follows:

1. 20.0 grams of colorant was added to 120.0 ml. of a 3 percent bone gelatin solution in $H_2O$, plus 80.0 ml. of a 20 percent solution of dextran (see U.S. Pat. No. 3,063,838, example I), and 20.0 ml. of isopropyl alcohol the solution being held at 125° F.

2. The mixture was stirred for 10 minutes during which 200.0 ml. of $H_2O$ and 4.0 ml. of isopropyl alcohol were added.

3. The mixture was stirred for 1 minute during which 1 ml. of Gantrez AN-139 a poly(methyl vinyl ether/maleic anhydride) manufactured by General Aniline & Film Corp., Commercial Development Department, was added.

4. The mixture was stirred for 1 minute, allowed to settle for 10 minutes, and then decanted.

5. 400.0 ml. of $H_2O$ and 2.0 ml. of isopropyl alcohol were added, the mixture allowed to settle, and then decanted.

6. Step 5 was repeated.

7. The residue was vacuum filtered and a dry pigment cake resulted after drying under an infrared heater for approximately 15 minutes.

8. The pigment cake was ground in a mortar and pestle with the resulting pigment particles having less than 50 percent of the particles with less than 1 micron diameter.

Samples of the treated colorants and untreated colorants were applied to the six photohardenable elements after imagewise exposure as in example I. The results after removal of particles as described in example I are tabulated below:

| Pigment | Percent of particles less than 1μ diameter | Stain |
|---|---|---|
| 1. Primrose Yellow | >50 | Moderate. |
| 2. Primrose Yellow (treated) | <50 | None. |
| 3. Monastral® Blue G | >50 | Heavy. |
| 4. Monastral® Blue G (treated) | <50 | Slight. |
| 5. Duol® Carmine | >50 | Heavy. |
| 6. Duol® Carmine (treated) | <50 | None. |

The embodiments of the invention in which an exclusive property or privilege is claimed are defined as follows:

1. An image reproduction process comprising imagewise exposing a photohardenable layer to actinic light to form hardened image areas without hardening underexposed areas, applying finely divided discrete solid particles of colorant to the exposed layer and removing particles in the hardened image areas, characterized by the improvement that the particles have a size distribution with the range 0.2 to 30 microns and not more than 50 percent of the particles are less than 1 micron equivalent spherical diameter.

2. A process according to claim 1 wherein the layer is photopolymerizable and contains a nongaseous ethylenically unsaturated monomer, a macromolecular organic polymer binder and an addition polymerization initiator activatable by actinic radiation.

3. A process according to claim 1 wherein more than 50 percent of the particles have a size of 5–10 microns.

4. A process for forming images from a stratum which is solid below 40° C. and contains 1. underexposed, tacky image areas which are thermally transferable by having a stick or transfer temperature above 40° C. and below 220° C., comprising (a) a thermoplastic compound solid at 50° C. and (b) an ethylenically unsaturated compound containing at least one terminal ethylenic group having a boiling point above 100° C. at normal atmospheric pressure and being capable of forming a high polymer by photoinitiated addition polymerization, and
2. exposed, complementary, adjoining, nontacky image areas solid at 50° C., not thermally transferable at said stick or transfer temperature at which the underexposed areas are thermally transferable, and comprising an addition polymer of an aforesaid ethylenically unsaturated compound and said thermoplastic compound; said process comprising A. applying finely divided discrete solid particles of colorant to the stratum, said particles having a size distribution within the range 0.2 to 30 microns and not more than 50 percent of the particles being less than 1 micron equivalent spherical diameter; and B. physically removing particles from the exposed image areas of the stratum.

5. A process according to claim 4 wherein said thermoplastic compound is a methyl methacrylate polymer and said unsaturated compound is trimethylolpropane trimethacrylate.

6. A process according to claim 1 wherein the discrete solid particles are polymeric matrices containing evenly dispersed pigment crystallites.

7. A process according to claim 6, wherein the polymeric matrix is a member selected from the group consisting of polyvinyl chloride, cellulose acetate, cellulose acetate butyrate, polystyrene, polymethyl methacrylate, polyvinyl alcohol, methyl cellulose, carboxymethyl cellulose, vinyl chloride/vinyl acetate copolymer, and gelatin.

* * * * *

PO-1050
(5/69)

UNITED STATES PATENT OFFICE
CERTIFICATE OF CORRECTION

Patent No. 3,620,726 Dated November 16, 1971

Inventor(s) Victor Fu-Hua Chu & Charles Walter Manger

It is certified that error appears in the above-identified patent and that said Letters Patent are hereby corrected as shown below:

Column 3, line 10, change "phorohardenable" to --photohardenable--.

Column 3, line 18, change "system" to --systems--.

Column 3, line 43, change "dyeredox" to --dye-redox--.

Column 3, line 71 "and" should be deleted.

Column 4, line 14, change "made" to --make--; change "it" to --its--.

Column 5, line 64, change "Δ2,2'-" to -- 2,2'- --.

Column 6, line 38, (Example II) change "-methoxphenyl" to -- -methoxyphenyl --.

Column 6, line 58, change "EXAMPLE II" to--EXAMPLE III--.

Columns 5 & 6, the large table at the bottom of page, in the heading of fifth column, change "Percent of colorant particles, Δμ dia." to --Percent of colorant particles < 1μ dia.--;

second column, line 7, change "Pig. Red 58" to --Pig. Red 48--;

fifth column, line 9, change "<60" to --<50--;

Columns 7 & 8, the large table at the top of page, in the heading of fifth column, change "Percent of colorant particles, Δμ dia." to --Percent of colorant particles < 1μ dia.--;

(continued on page 2)

PO-1050
(5/69)

UNITED STATES PATENT OFFICE
CERTIFICATE OF CORRECTION

Patent No. 3,620,726 Dated November 16, 1971

Inventor(s) Victor Fu-Hua Chu & Charles Walter Manger

It is certified that error appears in the above-identified patent and that said Letters Patent are hereby corrected as shown below:

Second column, line 3, change "Rig. Red 57" to --Pig. Red 57--.

Column 7, line 41, change "20.0 ml." to --2.0 ml.--.

Signed and sealed this 30th day of May 1972.

(SEAL)
Attest:

EDWARD M.FLETCHER,JR.
Attesting Officer

ROBERT GOTTSCHALK
Commissioner of Patents